(12) United States Patent
Riedinger et al.

(10) Patent No.: US 9,045,221 B2
(45) Date of Patent: Jun. 2, 2015

(54) METHOD OF GUIDANCE FOR AIRCRAFT TRAJECTORY CORRECTION

(71) Applicant: THALES, Neuilly-sur-Seine (FR)

(72) Inventors: Marc Riedinger, Plaisance du Touch (FR); Sylvain Lissajoux, Toulouse (FR); Anne-Sophie Bely, Toulouse (FR)

(73) Assignee: Thales, Courbevoie (FR)

( * ) Notice: Subject to any disclaimer, the term of this patent is extended or adjusted under 35 U.S.C. 154(b) by 266 days.

(21) Appl. No.: 13/679,956

(22) Filed: Nov. 16, 2012

(65) Prior Publication Data

US 2013/0206922 A1    Aug. 15, 2013

(30) Foreign Application Priority Data

Nov. 18, 2011    (FR) .................................... 11 03515

(51) Int. Cl.
| | |
|---|---|
| *G05D 1/00* | (2006.01) |
| *G05D 1/08* | (2006.01) |
| *G05D 3/00* | (2006.01) |
| *G06F 7/00* | (2006.01) |
| *G06F 17/00* | (2006.01) |
| *B64C 13/16* | (2006.01) |
| *G05D 1/02* | (2006.01) |

(52) U.S. Cl.
CPC .............. *B64C 13/16* (2013.01); *G05D 1/0204* (2013.01)

(58) Field of Classification Search
CPC ............................... B64C 13/16; G05D 1/0204
USPC ..................................................... 701/4, 10, 3
See application file for complete search history.

(56) References Cited

U.S. PATENT DOCUMENTS

| | | | | |
|---|---|---|---|---|
| 5,933,099 | A  * | 8/1999  | Mahon .......................... | 340/961 |
| 2006/0235581 | A1* | 10/2006 | Petillon ............................. | 701/3 |
| 2007/0075893 | A1* | 4/2007  | Filias et al. .................... | 342/104 |
| 2007/0179703 | A1 | 8/2007  | Soussiel et al. | |
| 2009/0055037 | A1 | 2/2009  | Dupre et al. | |
| 2010/0004798 | A1 | 1/2010  | Bodin et al. | |
| 2011/0295569 | A1* | 12/2011 | Hamke et al. ..................... | 703/2 |

FOREIGN PATENT DOCUMENTS

| | | |
|---|---|---|
| FR | 2896872 A1 | 8/2007 |
| FR | 2920232 A1 | 2/2009 |

* cited by examiner

*Primary Examiner* — Calvin Cheung
*Assistant Examiner* — Paula L Schneider
(74) *Attorney, Agent, or Firm* — Baker & Hostetler LLP

(57) ABSTRACT

Guidance for an aircraft correcting a trajectory deviation due to wind computes a roll command during trajectory alignment according to imposed alignment passing through a determined point, via a current angular divergence between a line through the point and aircraft and direction of alignment and of a current estimated ground speed of the aircraft with respect to a frame of reference. The current estimated ground speed is computed via a current air speed and stored wind speed. The stored wind speed is obtained via at least one wind speed computed via a first value of a first speed equal to the speed of the said aircraft with respect to a frame of reference originating from a satellite navigation system and a second value of a second speed equal to the air speed. The first and second value are simultaneously accounted earlier than or at the instant at the alignment phase.

13 Claims, 4 Drawing Sheets

US 9,045,221 B2

METHOD OF GUIDANCE FOR AIRCRAFT TRAJECTORY CORRECTION

CROSS-REFERENCE TO RELATED APPLICATION

This application claims priority to foreign French patent application No. FR 1103515, filed on Nov. 18, 2011, the disclosure of which is incorporated by reference in its entirety.

FIELD OF THE INVENTION

The invention relates to guidance systems for an aircraft and in particular when the aircraft is in a phase of approach or navigation with respect to a fixed direction which is communicated to it from outside and with which it must align itself.

BACKGROUND

As illustrated in FIG. 1, when the guidance system for an aircraft 10 has to slave the trajectory of the aircraft to a fixed direction 12 which corresponds to an alignment trajectory, the slaving takes place in three phases. In a first phase the pilot positions the aircraft so as to fly according to a trajectory having a known angle predetermined with respect to the direction of alignment. The direction of alignment passes with respect to a determined point 11.

For example, the information relating to the direction of alignment 12 comes from a wireless beacon 11 situated on the ground constituting this determined point, and emitting a radiofrequency signal constituting a directional beam. The useful angular aperture 13 of this beam, which is used during the alignment phase, is typically plus or minus a few degrees, typically +/−2.5° around the direction of alignment 12. The two ends of this angular aperture are designated by the straight lines 121 and 122. The direction of alignment 12 is commonly referred to as the "beam centre".

These beacons are for example of the runway alignment radio beacon type according to the acronym LOC standing for "Localizer". These LOC beacons may be for example those of a:

VHF runway alignment radio beacon referred to by the acronym ILS standing for "Instrument Landing System",
Microwave landing system referred to by the acronym MLS,
Satellite landing system referred to as GLS standing for "GNSS Landing system",
Landing system with LOC performance and vertical guidance referred to by the acronym LPV standing for "Localizer performance with vertical Guidance".

For systems for example of GLS or LPV type, the beacon is a pseudo-beacon which does not have any physical existence. It is a point whose coordinates are stored in a database. The FMS (Flight Managing System), or GPS system, establishes in this case a pseudo-beam on the basis of this datum.

These beacons are for example beacons used for navigation, where the direction of alignment 12 is selected by the pilot with the aid of an onboard control. This navigation system allows the pilot to align himself on radials of an omnidirectional beacon and the beacon is referred to by the acronym VOR standing for "Omni Directional Radio Range".

The first phase is identified as the capture arming phase. Typically during this phase the pilot positions the aircraft in such a way that its trajectory intercepts the directional beam with a known and predetermined angle commonly referred to as the angle of interception, the angle of interception being defined as the angle formed between the heading of the aircraft and the direction of alignment defined by the directional beam. From the instant $t_0$ at which the aircraft, previously oriented according to the correct angle of interception, cuts the direction 121 or 122, 121 in the example of FIG. 1, at the point 14 in FIG. 1, the alignment process enters its second phase commonly referred to as the capture phase, which corresponds to the alignment phase proper. At the start of the alignment phase the guidance system modifies the trajectory of the aircraft 14 by making it perform a turn.

The instant $t_0$ corresponds for example to the moment from which the detector situated on the aircraft 102, detecting a signal originating from the beacon, exhibits a response proportional to the angular divergence E between the straight line 111 passing through the beacon and the aircraft 102, and the direction of alignment 12. The guidance system controls the positioning of the aircraft so as to cancel this angular divergence E.

When the aircraft is established on a trajectory aligned with the direction 12, starting from the point 15 of FIG. 1, the guidance system enters the third phase commonly referred to as track mode.

The guidance system comprises algorithms which compute the roll angle of the aircraft and are commonly referred to as piloting laws.

Ideally during the alignment phase, the trajectory 16 of the aircraft 102 does not exceed an angle of more than typically 1 to a few degrees with respect to the direction 12 during its turn.

FIG. 2 describes the aircraft's roll command slaving loop during the phase of alignment with the guidance system according to a prior art. These aircraft guidance systems are simply equipped with navigation instruments 22 operating with respect to magnetic North and with respect to the ambient air, for example the systems of attitude and heading platform type according to the acronym AHRS standing for "Attitude and reference system".

The data accessible in this case to the guidance system are:
the speed vector with respect to the surrounding air Vair/mg referenced by its angle with respect to magnetic North equal to the magnetic heading CM of the aircraft, determined by the navigation instruments 22,
the angular divergence E measured by a receiver 20 situated on the aircraft.

The guidance system 25 thus computes a roll command 26 on the basis of these data. In this case the algorithms use conventional piloting laws, typically referred to as LOC or VOR (corresponding to the various types of beacons) to slave the trajectory of the aircraft to the beam of the beacon.

In the presence of wind 17 (and particularly when the wind is in a crosswise direction with respect to the direction of alignment), the aircraft equipped with such guidance systems will stray from the optimal trajectory 16, and thus overshoot the typical value by 1 to a few degrees corresponding to about ⅔ of the useful angular aperture 13. This trajectory deviation, referred to as overshoot, leads to a non-optimum trajectory 18 in FIG. 1, posing a problem for the air traffic control. The guidance system 25 is therefore unable to anticipate the deviation of the aircraft due to the wind, which moreover constrains the pilot to aid the guidance system by reducing the angle of interception, thereby lengthening the trajectory of the aircraft before the arming.

SUMMARY OF THE INVENTION

An aim of the invention is to mitigate the aforementioned drawbacks by proposing an aircraft guidance system making it possible to correct in part the deviation of the trajectory of the aircraft in the case of wind.

The subject of the invention is a guidance method for an aircraft for correcting a trajectory deviation due to the presence of wind, comprising a step of computing a roll command for the aircraft during a phase of alignment of the trajectory of the aircraft according to an imposed direction of alignment passing through a determined point, on the basis:
- of a current angular divergence between a straight line passing through the said determined point and the aircraft on the one hand and the direction of alignment on the other hand and,
- of a current estimated ground speed of the aircraft with respect to a frame of reference tied to the ground,
- the current estimated ground speed being computed on the basis of a current air speed of the aircraft with respect to the surrounding air and of a stored wind speed,
- the stored wind speed being obtained on the basis of at least one wind speed computed on the basis:
  - of a first value of a first speed equal to the speed of the said aircraft with respect to a frame of reference tied to the ground originating from a satellite navigation system and,
  - of a second value of a second speed equal to the air speed with respect to the surrounding air,
  - the first value and second value being taken into account simultaneously at at least one instant earlier than or equal to the instant at which the aircraft starts the alignment phase.

One advantage of the method according to the invention is the correction of the trajectory of the aircraft while taking into account the presence of the wind during the alignment phase, with the aid of an inexpensive satellite navigation system.

Another advantage of the invention is that the information relating to the wind is collected prior to the start of the alignment phase, thereby rendering the guidance system autonomous with respect to the satellite data during the alignment phase.

Advantageously the guidance method according to the invention is characterized in that the said current estimated speed is equal to the vector sum of the current air speed and of the stored wind speed. Such a vector computation allows accurate computation of the estimated speed.

Advantageously, the guidance method according to the invention is characterized in that the stored wind speed is obtained on the basis of at least one wind speed determined at at least one instant earlier than or equal to the instant at which the aircraft starts the alignment phase Advantageously, the guidance method according to the invention is characterized in that the wind speed is equal to the vector difference between the first speed and the second speed. Such a vector computation allows accurate computation of the wind speed.

In one embodiment, the guidance method according to the invention is characterized in that the stored wind speed is equal to the wind speed computed at the instant at which the aircraft starts the alignment phase. Thus, the stored wind speed is obtained without it being necessary to store the wind speeds at instants strictly prior to the start of the alignment phase, thereby simplifying the system for processing this datum.

In one embodiment, the guidance method according to the invention is characterized in that the stored wind speed is the result of a digital processing performed on the basis of wind speeds computed over a plurality of instants. Such processing makes it possible to take into account the history of the wind speed prior to the start of the engagement phase, thereby making it possible to obtain an estimated wind speed that is closer to the real speed.

According to one embodiment, the guidance method according to the invention is characterized in that the digital processing is a temporal average of wind speeds computed at a plurality of instants.

Advantageously, the method according to one the invention is characterized in that the computation step uses a magnetic declination datum provided by an additional onboard system so as to express the said speeds in one and the same reference frame. Taking this datum into account allows exact vector computation in the case where the speeds Vair and Vsol are not obtained directly in the same reference frame.

Advantageously, the method according to the invention is characterized in that the imposed direction of alignment is determined by a beacon situated on the ground constituting the determined point which emits a signal and which generates a directional beam. Thus the method is compatible with a conventional alignment system in aeronautics using emitting beacons. The beacon can also be a pseudo-beacon used for example in the GLS or LPV systems described previously.

Advantageously, the method according to the invention is characterized in that the instant at which the aircraft starts the said alignment phase corresponds to the instant from which the detector of the signal situated on the aircraft exhibits a response proportional to the angular divergence.

Advantageously, the method according to one the invention is characterized in that the computation step is able to compute a roll command on the basis of the speed of the aircraft with respect to the air as replacement for the current estimated ground speed of the aircraft.

Advantageously, the method according to the invention is characterized in that when the data originating from the satellite navigation system are not provided by the navigation system or are erroneous, the current estimated ground speed of the aircraft is replaced with the current air speed of the aircraft for the computation of the roll command. The advantage is that, in case the satellite navigation system or the additional system were not to provide the expected data, the system replaces the datum Vsol−est(mg(t) with the speed Vair/mg(t) delivered by the onboard navigation instrument 22 and the computer then performs the computation of the roll command according to the conventional prior art described in FIG. 2. Thus a usable datum is always provided to the computer 41.

The subject of the invention is also a system for the guidance of an aircraft able to correct a trajectory deviation due to the presence of wind comprising
- a computation module for computing a roll command for the aircraft during a phase of alignment of the trajectory of the aircraft according to an imposed direction of alignment passing through a determined point, on the basis:
- of a current angular divergence between a straight line passing through the said determined point and the aircraft on the one hand and the said direction of alignment on the other hand, and
- of a current estimated ground speed of the aircraft with respect to a frame of reference tied to the ground,
- a computation module 43 for computing the current estimated ground speed of the aircraft on the basis of a current air speed of the aircraft with respect to the surrounding air and of a stored wind speed,
- a computation module 44 for computing the stored wind speed on the basis:

of a first value of a first speed equal to the speed with respect to a frame of reference tied to the ground of the said aircraft originating from a satellite navigation system and of a second value of a second speed equal to the air speed with respect to the surrounding air, the first value and second value being taken into account simultaneously at at least one instant earlier than or equal to the instant at which the aircraft starts the said alignment phase

BRIEF DESCRIPTION OF THE DRAWINGS

Other characteristics, aims and advantages of the present invention will become apparent on reading the description which follows and the appended drawings given by way of nonlimiting examples and in which.

DETAILED DESCRIPTION

Figure 3:
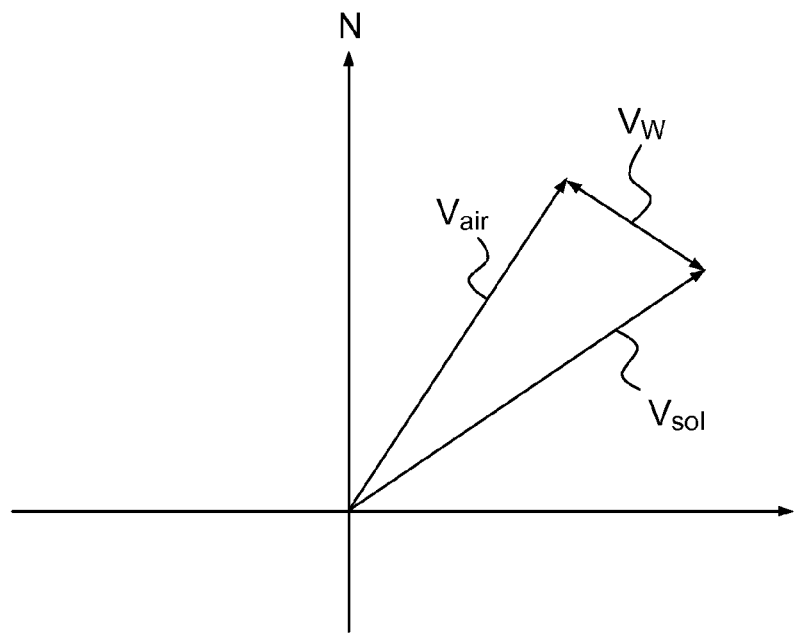
FIG. 3 illustrates the vector relation between the speed of the aircraft with respect to the air, the speed of the aircraft with respect to the ground and the wind.

In the presence of wind 17, for example a wind directed crosswise with respect to the trajectory of the aircraft, the speed vector of the aircraft with respect to a frame of reference tied to the ground, Vsol, is different from the speed vector of the aircraft with respect to the surrounding air Vair. FIG. 3 describes the vector relation between these various speeds: In FIG. 3 the wind 17 is defined by a speed vector Vw. We have:

$$Vsol = Vair + Vw$$

To incorporate the presence of the wind, the guidance system must know the speed vector Vsol, since it is Vsol which must be aligned with the direction of alignment 12.

Figure 4:
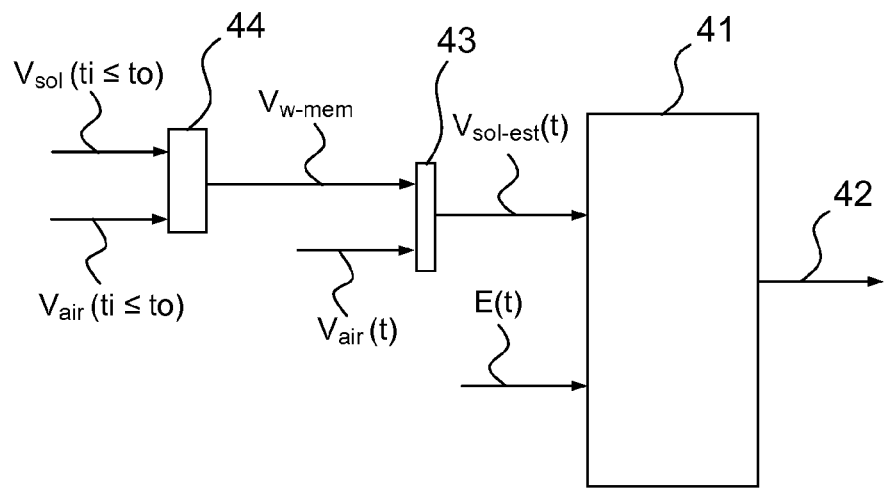
FIG. 4 describes the principle of the invention.

The principle of the invention is described by FIG. 4. The invention applies to any type of aircraft, such as an aeroplane, a helicopter or a drone.

The method allowing the computation of the roll command 42 at an instant t by the computer 41 is performed on the basis of the following data:

the angular divergence E(t) or current angular divergence similar to that used in the prior art.

a speed of the aircraft with respect to the ground at the instant t Vsol-est(t), this current speed being an estimated speed computed by the computation module 43 on the basis of two data:

the current speed with respect to the surrounding air Vair(t), identical to that provided to the guidance system 25 according to the prior art.

a stored wind speed Vw/mem which does not correspond to the current wind speed at the instant t.

The invention makes it possible to correct the trajectory of the aircraft by taking into account the presence of wind, preventing it from deviating too much with respect to its optimal trajectory.

According to the invention, the stored wind speed Vw/mem corresponds to the wind speed at at least one instant prior to the entry of the aircraft into the alignment phase, computed with the aid of data arising from a satellite navigation system. One advantage of the method according to the invention is the correction of the trajectory of the aircraft while taking into account the presence of the wind during the alignment phase, with the aid of an inexpensive satellite navigation system. Thus, it is not necessary to resort to an onboard inertial unit in order to get the speed of the aircraft with respect to the ground. This instrument is expensive and not all aircraft are equipped.

The signal originating from a satellite may be masked, for example by the wings during the turn performed at the start of the alignment phase, or by the rotors of a helicopter. Therefore, for safety reasons, it is preferable not to use these satellite data when the pilot has selected an approach or an alignment based on another technology (for example ILS, MLS).

The speed Vsol-est(t) is a speed estimated, at an instant t, on the basis of a wind speed measured prior to the instant $t_0$ of entry of the aircraft into the alignment phase.

Vsol-est can be deduced from the vector relation:

$$Vsol\text{-}est(t) = Vair(t) + Vw/mem$$

Another advantage of the invention is that the information relating to the wind is collected prior to the start of the alignment phase, thereby rendering the guidance system autonomous with respect to the satellite data during the alignment phase.

The wind speed Vw(ti) at an instant ti prior to $t_0$ is computed by the computation module 44, preferably on the basis of the vector relation:

$$Vw(ti) = Vsol(ti) - Vair(ti)$$

in which Vsol(ti) represents the speed of the aircraft with respect to the ground at the instant ti and Vair(ti) represents the speed of the aircraft with respect to the surrounding air at the instant ti.

For the computation of the wind speed at the instant ti Vw(ti), the aircraft's ground speed vector Vsol(ti) and air speed vector Vair(ti) are taken into account simultaneously.

According to a first option, the stored wind speed Vw/mem used by the computer 41 is equal to the wind speed at the instant t0 at which the aircraft starts the alignment phase.

$$Vw/mem = Vw(t0)$$

According to a second option, the stored wind speed Vw/mem used by the computer 41 is the result of a digital processing performed on the basis of the wind speed values at various instants.

For example, the stored wind speed Vw/mem used by the computer 41 is equal to a temporal average of the values of the wind speeds at various instants ti, i an integer between 1 and n, ti being prior to t0, as illustrated by the following relation:

$$mem = \frac{1}{n} \cdot \sum_{i=1}^{n} Vw(ti)$$

According to another example the stored wind speed Vw/mem used by the computer 41 is equal to an average used by the computer 41 is equal to a continuous temporal average of the wind speed between two instants t1 and t2 prior to t0, with t1 prior to t2, as illustrated by the following relation:

$$Vw\text{-mem} = \frac{1}{(t2-t1)} \cdot \int_{t1}^{t2} Vw(t)\,dt$$

Figure 5:
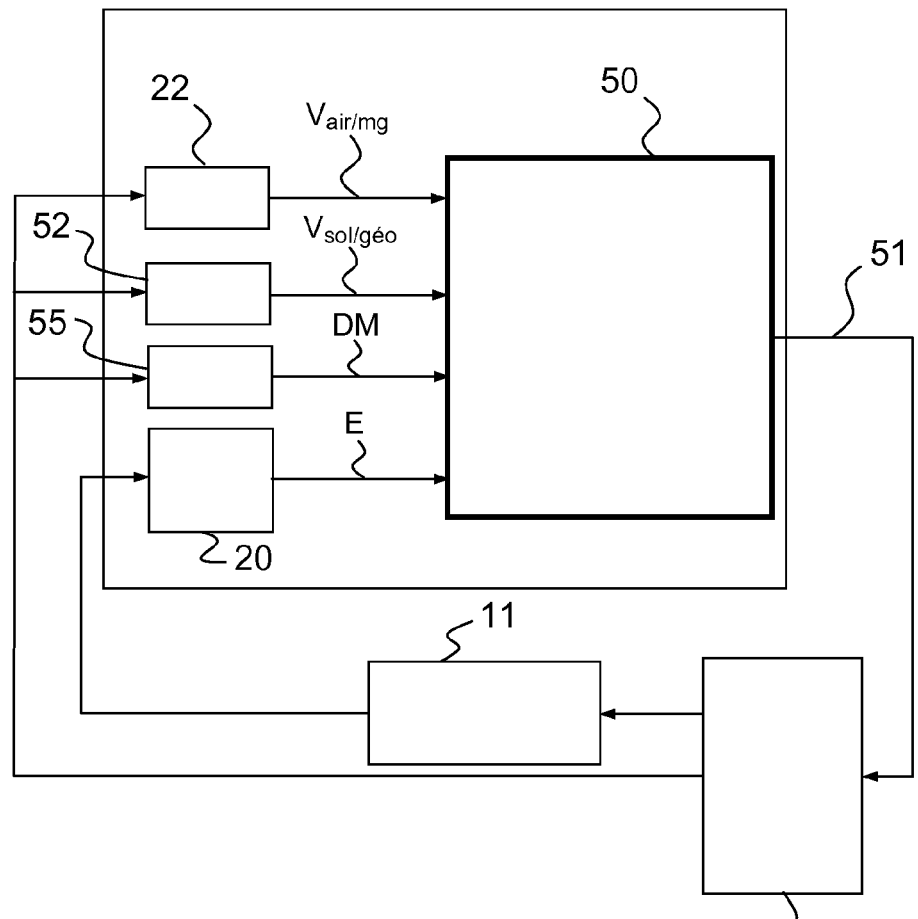
FIG. 5 describes a preferred mode of the invention.

FIG. 5 describes the loop for slaving the roll command for the aircraft to the guidance system according to the invention according to a preferred mode.

The speed Vsol(ti) is accessible via the satellite navigation system, and referenced with respect to geographical North.

The vector speed Vair is referenced with respect to magnetic North, by the magnetic heading.

The exact computation of the wind speed Vw by vector difference therefore requires having the air speed vector Vair and the ground speed vector Vsol expressed in the same reference frame. For these purposes according to a preferred mode of the invention use is made of the magnetic declination information DM making it possible to pass from one reference frame to the other, this datum being provided by a third-party onboard system 55, such as for example the flight management computer or FMS, according to the acronym standing for "Flight Management System".

The guidance system 50 delivers the roll command 51 to the aircraft 10 and operates according to the method of the invention. It receives the following data:
- the divergence E as defined previously via an onboard receiver 20 which receives a signal originating from a beacon or a pseudo beacon 11,
- the speed vector Vair/mg, whose modulus is the speed of the aircraft with respect to the surrounding air and whose orientation is defined with respect to magnetic North by the magnetic heading CM, these data being measured by conventional navigation instruments 22 onboard the aircraft,
- the speed vector of the aircraft with respect to the ground Vsol/geo, whose modulus is the speed of the aircraft with respect to a reference frame tied to the ground and whose orientation is defined with respect to geographical North, these data being obtained via receiver 52 able to receive a navigation signal coming from a satellite,
- the magnetic declination DM provided by an onboard third-party system 55, such as for example the FMS.

Figure 6:
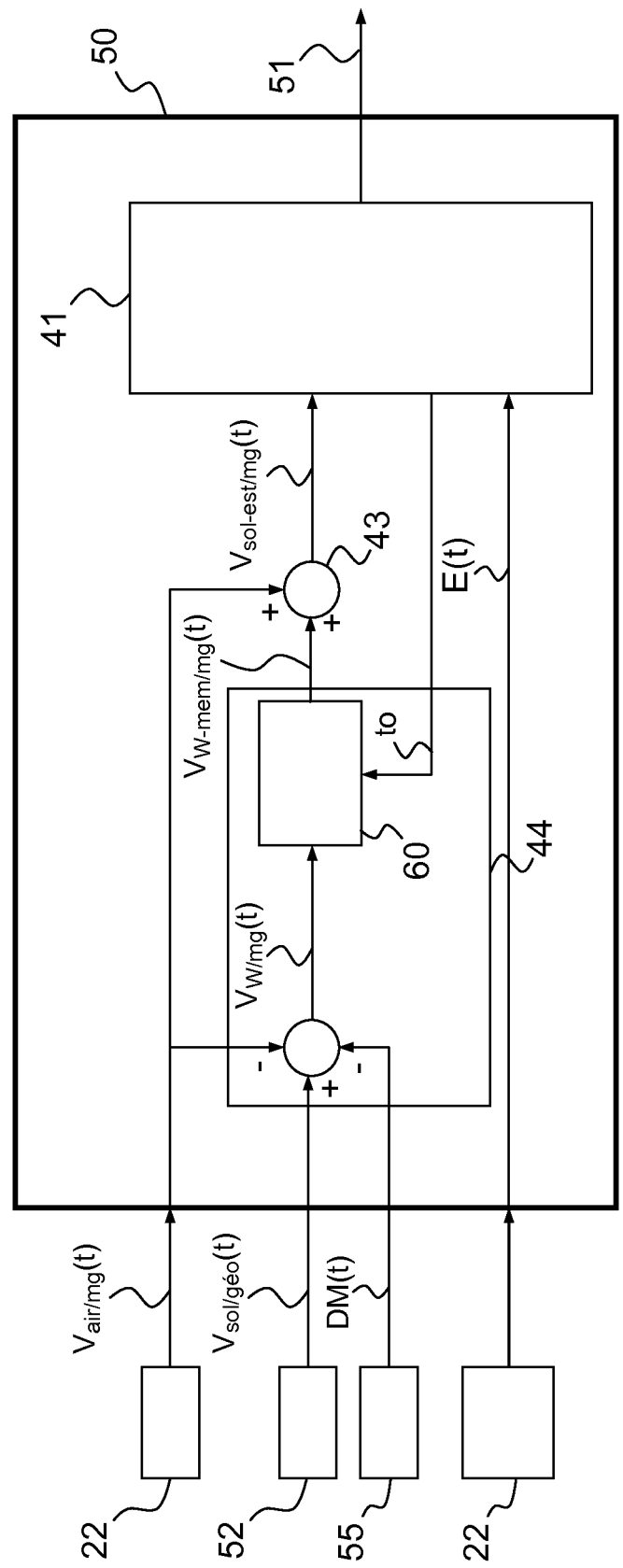
FIG. 6 describes an exemplary implementation of the preferred mode of the invention described in FIG. 5.

FIG. 6 describes an exemplary implementation of the preferred mode described in FIG. 5:
- the ground speed in the magnetic reference frame Vsol/mg is computed on the basis of the ground speed in the geographical reference frame Vsol/geo obtained from the receiver of the satellite signal 52 and the magnetic declination DM obtained from an additional onboard system 55.
- the wind speed in the magnetic reference frame Vw/mg is computed on the basis of Vsol/mg and of Vair/mg obtained from the navigation instrument 22 through the vector relation:

$$Vw/\text{mg} = V\text{sol}/\text{mg} - V\text{air}/\text{mg}$$

The wind speed Vw/mg is thus computed, stored and optionally processed in a system 60.

The computer 41 computes which phase the aircraft is in and determines the instant $t_0$ from which the aircraft starts the alignment phase. From this instant the system 60 freezes the data and delivers a stored wind speed Vw-mem/mg to the module 43.

This speed Vw-mem/mg computed on the basis of data collected at instants prior to the instant $t_0$ at which the aircraft starts the alignment phase thus circumvents the availability and the accuracy of the satellite navigation system and the additional system 55 providing the magnetic declination DM for the subsequent guidance of the aircraft.

During the alignment phase, the module 43 computes the current speed Vsol–est/mg on the basis of the vector formula:

$$V\text{sol-est}/\text{mg}(t) = V\text{air}/\text{mg}(t) + VW\text{-mem}/\text{mg}$$

The datum Vsol–est/mg(t) is provided, together with the divergence E(t) to the computer 41 which delivers the roll command 51.

Figure 1:
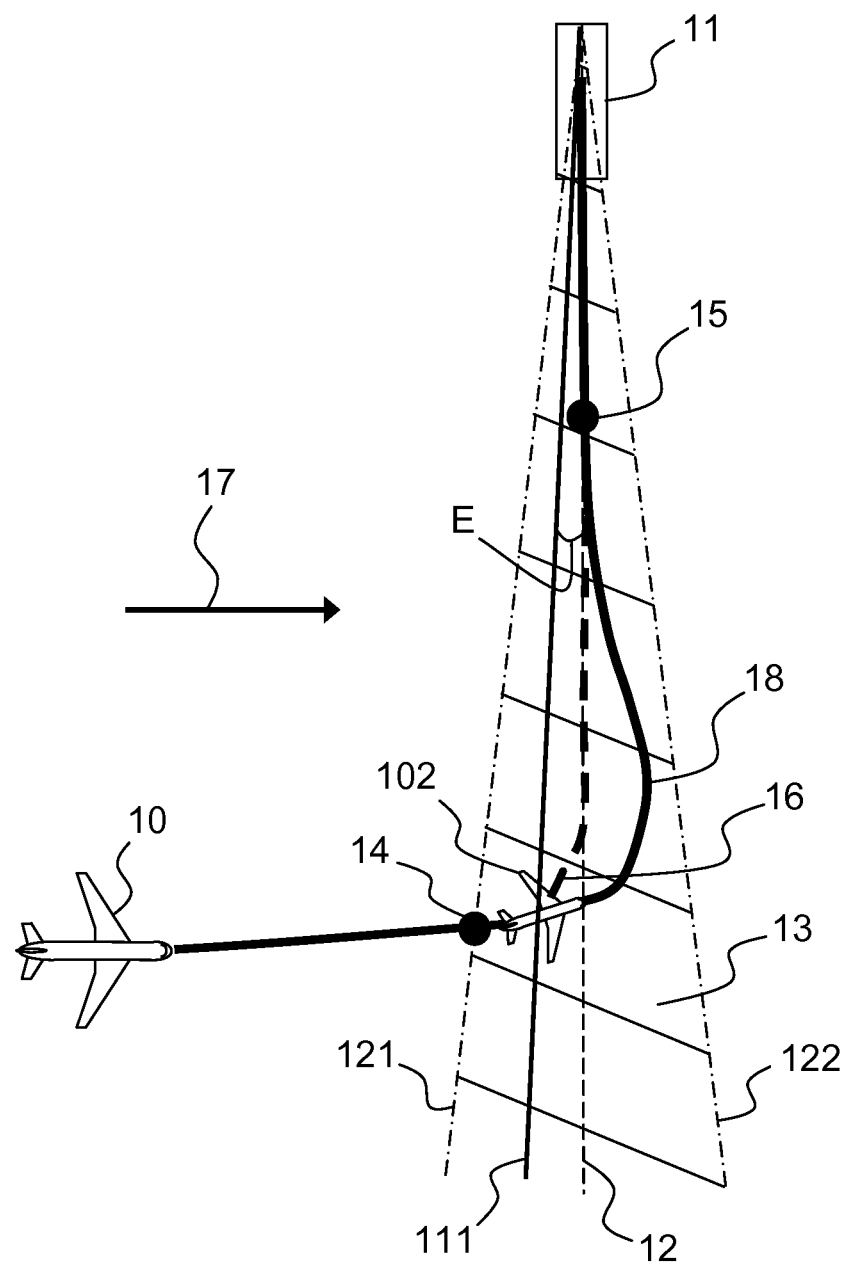
FIG. 1 already presented describes the aircraft's three approach phases to align itself with a given direction, as well as the aircraft's trajectory deviation due to the presence of wind according to the prior art.
Figure 2:
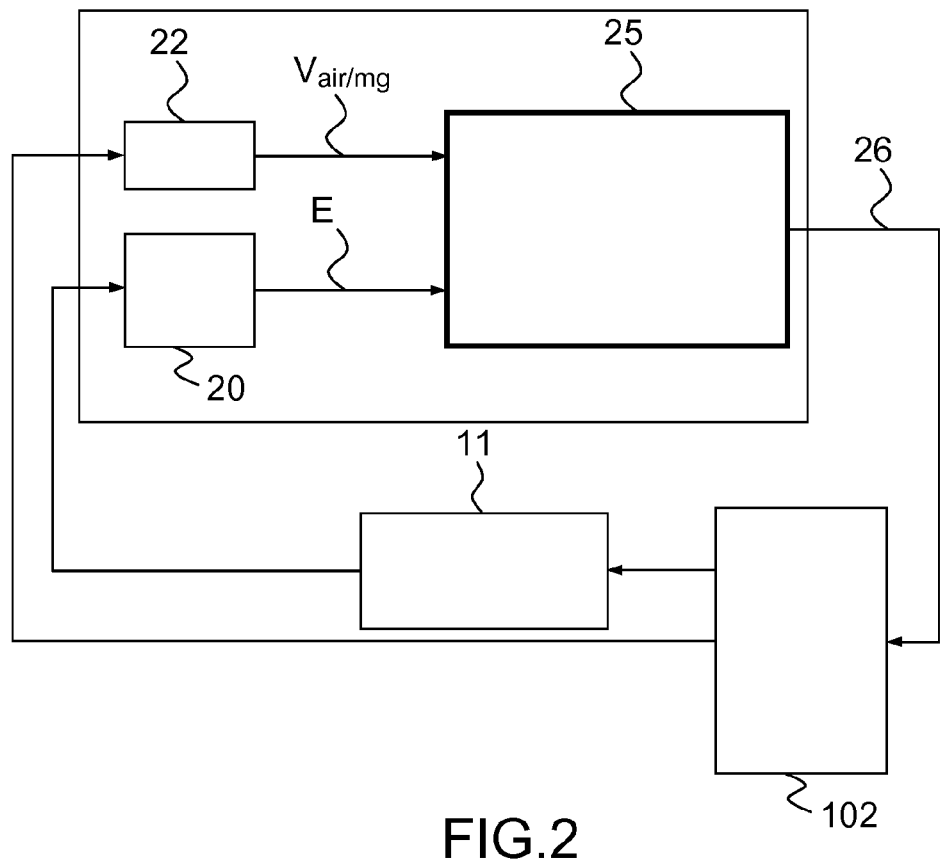
FIG. 2 already presented describes the loop for slaving the aircraft to the guidance system according to the prior art.

According to a first advantageous variant, the computer 41 of the roll command according to one aspect of the invention is able to compute the said roll command on the basis of the said speed of the aircraft with respect to the air as replacement for the said current estimated ground speed of the aircraft, according to the prior art described in FIG. 2. The performance obtained in this case is identical to that of a conventional guidance system.

According to a second advantageous variant, the computer 41 of the roll command is a computer according to the prior art using conventional piloting laws, for example of LOC or VOR type.

These two variants present the advantage that, in case the satellite navigation system or the additional system 55 were not to provide the expected data, the system replaces the datum Vsol–est/mg(t) with the speed Vair/mg(t) delivered by the onboard navigation instrument 22 and the computer then performs the computation of the roll command according to the conventional prior art described in FIG. 2. Thus a usable datum is always provided to the computer 41.

Were the satellite navigation system or the additional system 55 to provide erroneous data, the computer 41 would deliver a non-optimal command which degrades the trajectory of the aircraft. According to an option the alignment phase is performed under the surveillance of the pilot who can choose either to resume control or to switch over to a conventional computation of the roll command.

The second variant also presents the advantage of implementing the method according to one aspect of the invention on a guidance system according to the prior art described in FIG. 2, pre-existing in the aircraft, in the form of the addition of an additional system, compatible with the latter. In the example of FIG. 6, the additional system comprises modules 43 and 44, a receiver 52 of the satellite signal and access to the magnetic declination information via for example a connection to the FMS 55.

The invention claimed is:

1. A guidance method of an aircraft for correcting a trajectory deviation due to a presence of wind during a phase of alignment of a trajectory according to an imposed direction of alignment passing through a determined point comprising the steps of:
   determining an instant at which the aircraft starts the alignment phase with a guidance system;
   determining a stored wind speed on a basis of at least one wind speed computed by the guidance system on the basis:
   of a first value of a first speed equal to a speed of the aircraft with respect to a frame of reference tied to the ground originating from a satellite navigation system, and
   of a second value of a second speed equal to the air speed with respect to the surrounding air,
   wherein the first and second values being taken into account simultaneously at at least one instant earlier than or equal to the instant at which the aircraft starts the alignment phase, loading a current air speed of the aircraft with respect to the surrounding air to the guidance system;

determining a current estimated ground speed of the aircraft with respect to a frame of reference tied to the ground on the basis of the current air speed and of the determined stored wind speed with the guidance system;

loading a current angular divergence to the guidance system between a straight line passing through the determined point and the aircraft on the one hand and the direction of alignment on the other hand; and computing a roll command of the aircraft with the guidance system during said phase of alignment on the basis of said current angular divergence and said current estimated ground speed, the computing of the roll command being thus performed without using the satellite navigation system during the alignment phase for determining a current ground speed.

2. The guidance method according to claim 1 wherein the said current estimated speed is equal to the vector sum of the said current air speed and of the said stored wind speed.

3. The guidance method according to claim 1 wherein the said stored wind speed is obtained on the basis of at least one wind speed determined at at least one instant earlier than or equal to the instant at which the aircraft starts the said alignment phase.

4. The guidance method according to claim 1 wherein the said wind speed is equal to the vector difference between the said first speed and the said second speed.

5. The guidance method according to claim 1 wherein the said stored wind speed is equal to the said wind speed computed at the said instant at which the aircraft starts the said alignment phase.

6. The guidance method according to claim 1 wherein the said stored wind speed is the result of a digital processing performed on the basis of wind speeds computed over a plurality of instants.

7. The guidance method according to claim 6 wherein the said digital processing is a temporal average of wind speeds computed at a plurality of instants.

8. The method according to claim 1 wherein the said computing step uses a magnetic declination datum provided by an additional onboard system so as to express the said speeds in one and the same reference frame.

9. The method according to claim 1 wherein the said imposed direction of alignment is determined by a beacon situated on the ground constituting the said determined point which emits a signal and which generates a directional beam.

10. The method according to claim 9 wherein the instant at which the aircraft starts the said alignment phase corresponds to the instant from which the detector of the said signal situated on the aircraft exhibits a response proportional to the said angular divergence.

11. The method according to claim 1 wherein the said computing step is able to compute a roll command on the basis of the said speed of the aircraft with respect to the air as replacement for the said current estimated ground speed of the aircraft.

12. The method according to claim 11 wherein when the data originating from the said satellite navigation system are not provided by the said navigation system or are erroneous, the said current estimated ground speed of the aircraft is replaced with the said current air speed of the aircraft for the said computation of the said roll command.

13. A system for the guidance of an aircraft able to correct a trajectory deviation due to the presence of wind comprising:

a computation module, coupled to a computer, computing a roll command for the aircraft during a phase of alignment of the trajectory of the aircraft according to an imposed direction of alignment passing through a determined point, on the basis:

of a current angular divergence between a straight line passing through the said determined point and the aircraft on the one hand and the said direction of alignment on the other hand, and of a current estimated ground speed of the aircraft with respect to a frame of reference tied to the ground, a second computation module, coupled to the computer, computing the said current estimated ground speed of the aircraft on the basis of a current air speed of the aircraft with respect to the surrounding air and of a stored wind speed; and a third computation module, coupled to the computer, computing the said stored wind speed on the basis:

of a first value of a first speed equal to the speed with respect to a frame of reference tied to the ground of the said aircraft originating from a satellite navigation system, and of a second value of a second speed equal to the said air speed with respect to the surrounding air, the first value and the second value being taken into account simultaneously at at least one instant earlier than or equal to the instant at which the aircraft starts the said alignment phase.

\* \* \* \* \*